May 9, 1967  S. J. DORN  3,318,022
TEACHING AIDS AND EDUCATIONAL TOYS
Filed May 26, 1966  3 Sheets-Sheet 1

INVENTOR.
SAUL JAMES DORN
BY
Barnett + Barnett
ATTORNEYS

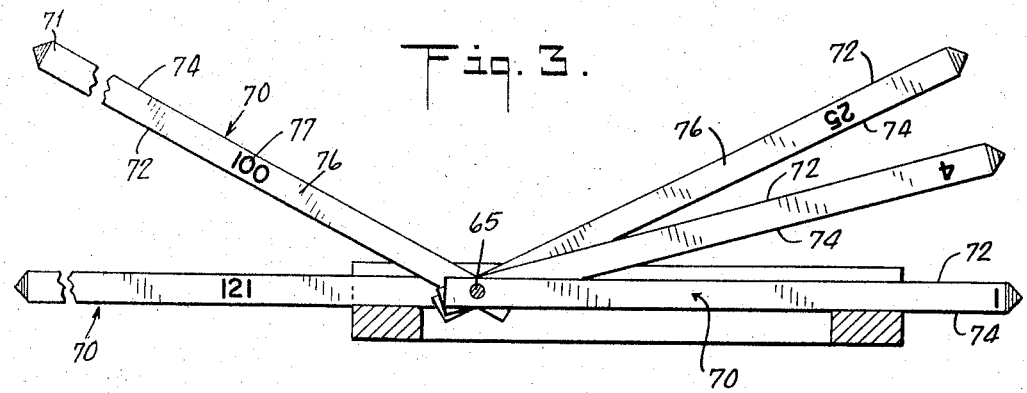
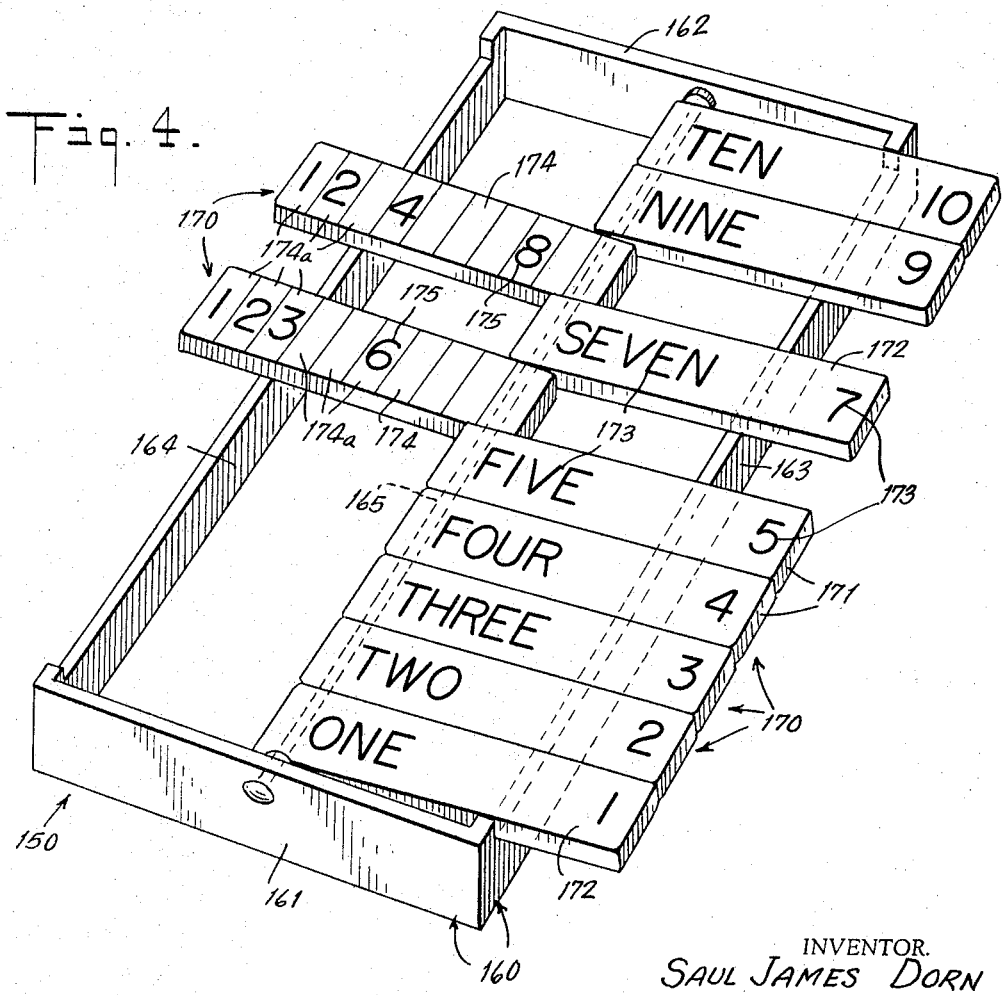

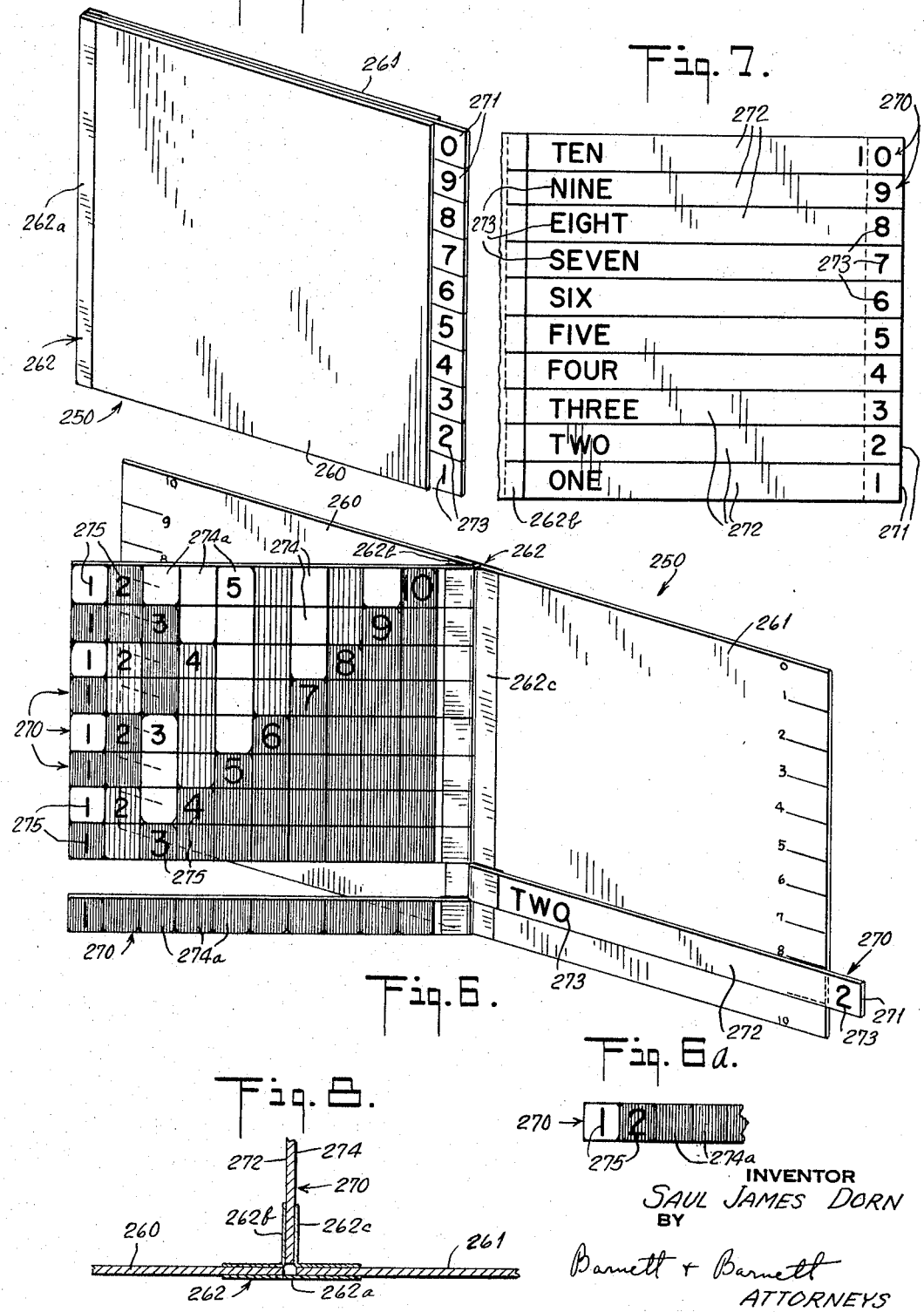

United States Patent Office 3,318,022
Patented May 9, 1967

3,318,022
TEACHING AIDS AND EDUCATIONAL TOYS
Saul James Dorn, 917 N. Brodhead Road, Center Township, Aliquippa, Pa. 15001
Filed May 26, 1966, Ser. No. 553,147
12 Claims. (Cl. 35—31)

This is a continuation-in-part of applicant's co-pending application Ser. No. 358,576, filed Apr. 9, 1964 and now forfeited.

This invention relates to teaching aids, educational toys and the like and more particularly is directed to such devices for teaching elementary arithmetic.

Among the objects of the invention is to provide improved teaching aids and learning devices of the character described which shall be capable of introducing and illustrating numbers to children at the pre-school and first grade level and progressing to higher levels, which devices may be made in several numerical ranges to conform to age and progress requirements, for example, a beginner's range of numbers from one to ten, an intermediate range from one to twenty, and greater ranges from one to fifty, one to one hundred, etc., being limited only by practical needs, which devices shall teach basic numerical and arithmetical relationships using physical means specially arranged and bearing numerical indicia, which shall serve as a quasi-computer enabling the children to perform the operations of addition, subtraction, multiplication and division, which shall be capable of introducing the more advanced concepts of squaring and square root, which device shall permit movement of the physical means, provide color and sound to hold the attention and interest of the pre-school and first grade child, which devices shall be adaptable for use in the classroom by each child under the direction of a teacher as well as by the child individually at home as an educational toy or as a learning aid in doing homework exercises, which devices shall comprise few and simple parts, be inexpensive to manufacture and assemble, safe and easy to operate, require a minimum of repair or maintenance, be rugged in construction and practical and efficient to a degree in use.

Other objects of the invention will in part be obvious and in part hereinafter pointed out.

The invention accordingly consists of features of constructions, combinations of elements and arrangements of parts which will be exemplified in the constructions hereinafter disclosed, the scope of the application of which will be indicated in the claims following.

In the accompanying drawing in which various embodiments of the invention are shown:

FIG. 3 is a sectional view taken on line 3—3 in FIG. 1 but showing counters Nos. 2, 5 and 10 in transit between the position shown in FIG. 1 to that shown in FIG. 2 and exposing a third side surface and the information imprinted thereon.

FIG. 4 is a perspective view of a modified form of arithmetic teaching aid having ten counters of larger dimensions for use by pre-schoolers and first graders.

FIG. 5 is a perspective view of another modified form of arithmetic teaching aid embodying the invention in book or folder form shown in closed position.

FIG. 6 is a perspective view of the folder of FIG. 5 shown in open position.

FIG. 6a is a fragmentary view of the reverse side of the free end portion of counter 2 shown in FIG. 6.

FIG. 7 is a fragmentary plan view of the folder in open position with all the counters shown on the right half of the folder exposing all the top surfaces thereof, and FIG. 8 is a detail sectional view taken through the binding of the folder.

Referring in detail to the drawings, 50 generally denotes an arithmetic teaching aid comprising a frame 60 supporting a plurality of counters 70 in side by side relation for separately pivoting on rod 65 to selectively expose opposite surfaces 72 and 74 of each of the counters 70.

Figure 1:
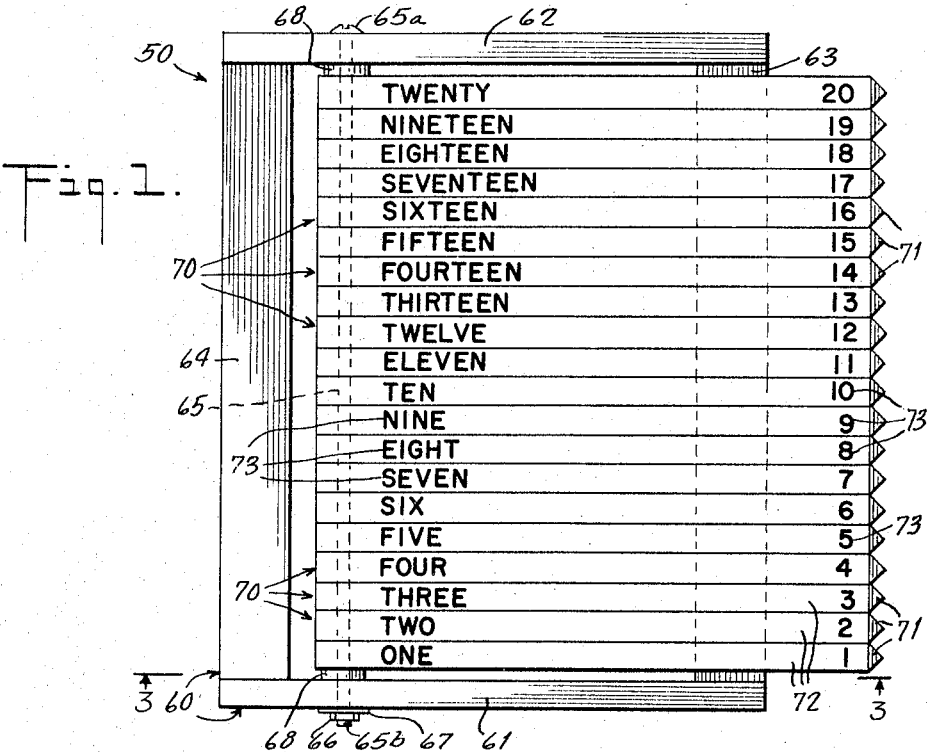
FIG. 1 is a top plan view of an arithmetic teaching aid constructed to embody the invention, the pivotable counters being shown all extending to the right to expose one of the side surfaces of each counter to view.
Figure 2:
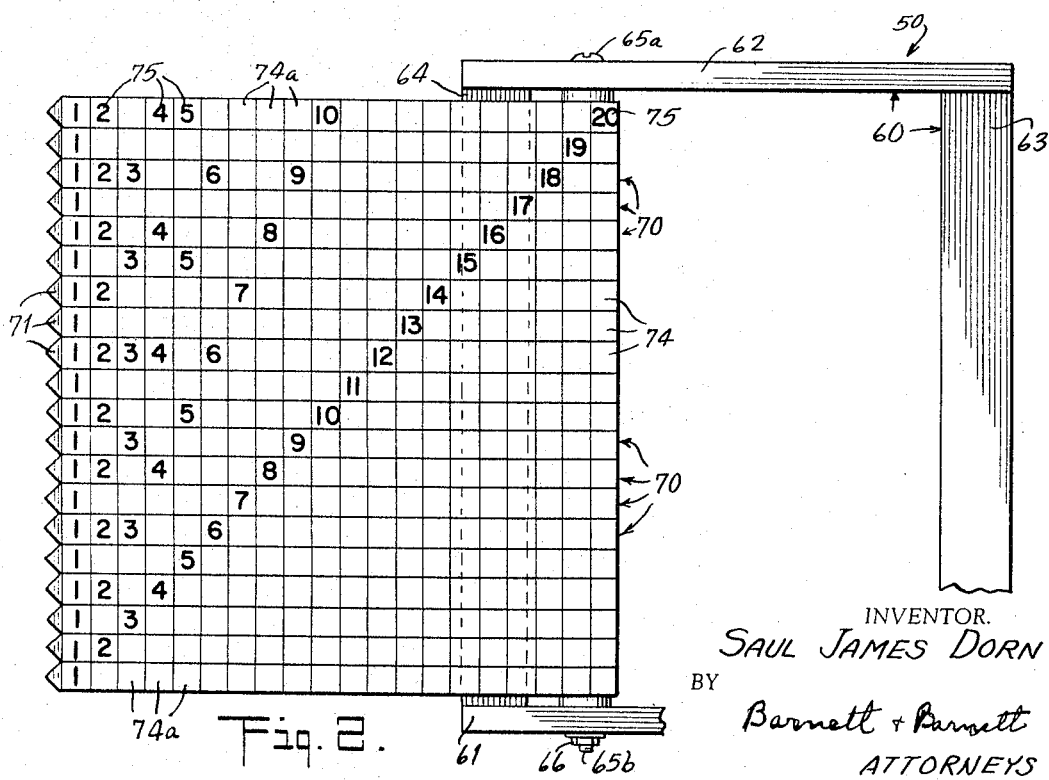
FIG. 2 is a top plan view of the teaching aid shown in FIG. 1 but with the counters all extending to the left to expose the opposite side surfaces of each counter to view.

Frame 60 may be made of any suitable material, such as, wood, plastic, pressed fibre board, cardboard, light metal and the like or a combination thereof, fabricated in any well known manner to have front and rear walls 61 and 62 interconnected by right and left transverse walls 63 and 64. Rod 65, which may be fashioned of wood, plastic or metal is positioned between and spaced from transverse walls 63, 64 and suitable supported at its opposite ends by front and rear walls 61 and 62, as for example, by passing through openings formed in the latter. As shown in FIGS. 1 and 2, rod 65 may have an integral head 65a and a threaded opposite end 65b for receiving nut 66 for tightening against washer 67. Suitable spacers 68 may be utilized between walls 61, 62 and the counters 70.

Counters 70 may be made of any suitable material similar to frame 60 and are preferably each substantially identical in size and shape. As shown in FIGS. 1, 2 and 3, rod 65 extends through an opening formed adjacent one end of each of the counters 70 for pivotally supporting the latter thereon. Each counter 70 is seen to comprise an elongated bar of substantially square cross-section and be of sufficient length to selectively extend across either of the transverse walls 63 or 64 for resting thereon and therebeyond for easy access to the free ends 71 thereof for manipulation in the manner hereinafter more fully described.

As will be clear from FIG. 1, when the counters 70 are positioned to rest on right transverse wall 63, a surface of each counter 70 is exposed to view, said surface being designated for purposes of description as the top surface 72 which carries indicia 73. The latter each consists of the numerical designation of the particular counter corresponding to its relative position from one end of the frame, as for example, from the front wall 61. Each indicia 73 may preferably include the numerical designation spelled out in word form, "one," "two," "three," "four" etc. and in corresponding numerals "1," "2," "3," "4" etc., the numerals being arranged in alignment adjacent the free end 71.

As will be clear from FIG. 2, when the counters 70 are positioned to rest on left transverse wall 64, an opposite surface of each counter 70 is exposed to view, said opposite surface being designated for purposes of description as the bottom surface 74 which carries indicia 75. Each indicia 75 relates arithmetically to the numeral appearing as indicia 73 on the top surface 72 of its respective counter 70 and includes numerals which are factors thereof. Thus each counter 70 carries on surface 74, as part of indicia 75, the numeral "1." Alternate counters 70 also bear the numerals "2," while every third counter 70 bears the numerals "3," etc.

In order that indicia 75 provide an overall desired pattern to correlate the factors of the individual counters with each other, bottom surface 74 has suitable means for properly positioning, that is, aligning, the factors of one counter with similar factors of the other counters.

Such positioning means may take the form of a series of equal size boxes 74a arranged side by side along the length of bottom surface 74, the number of boxes 74a being preferably equal to the total number of counters 70 utilized in the teaching aid 50 and shown in FIGS. 1 and 2 as twenty in number. Thus, when the bottom surfaces 74 of all the counters 70 are upfacing and visible as in FIG. 2, the boxes 74a form a large rectangle, preferably a square subdivided into four hundred small squares arranged in vertical columns and horizontal rows of twenty boxes 74a each. Beginning at the left, each factor is positioned numerically in its corresponding box. Since all numbers are divisible by one, the numeral "1" appears in the first box 74a of each counter 70. Each number is also divisible by itself so that the number of the particular counter 70 appears in its corresponding box forming a diagonal row of consecutive numbers extending from the lower left hand corner to the upper right hand corner of the large square. The factors of each number between the abovementioned extremes when placed in their corresponding boxes 74a, form consecutively arranged vertical columns of the same number, the vertical spacing in any one column being determined by the value of the particular number.

The front facing side surface 76 of each counter 70 may also carry an indicia 77 which is numerically related to the particular counter. Thus as seen in FIG. 3, such indicia 77 may be the square of the particular numeral constituting indicia 73, for example, the first counter 70 has the square shown as "1," the second counter 70 has its square shown as "4," the fifth counter 70 has its square shown as "25," and the eleventh counter 70 has its square shown as "121" etc.

The utility of the invention will now be apparent. Each child in a class is given a teaching aid 50 and instructed to place it on the desk in front of him so that the front wall 61 faces him and, for the purpose of familiarization, is shown how to flip the counters 70 between the two rest positions shown in FIGS. 1 and 2, by using his finger tips under free ends 71. As indicated in the drawings, counter free ends 71 may be tapered and project beyond transverse side walls 63, 64 to facilitate selection of individual counters for flipping from one position to the other. The flipping also results in sound when the counter 70 strikes the opposite transverse side wall 63 or 64, providing a degree of animation which helps satisfy the noise making desire. The movement required for flipping counter 70 and the resulting sound aid in holding the child's interest and increasing his span of concentration. The arithmetic lesson may then be given utilizing teaching aid 50 in the following respects:

(A) Recognition of numbers as expressed in Arabic numeral and word symbols and their proper sequential arrangement. Indicia 73 include both of these symbols.

(B) Addition and substraction. Indexed counters 70 physically illustrate quantities. The two alternate and oppositely extending rest positions of counters 70 permit group segregation of desired quantities. The pivotal attachment and physical configuration of couners 70 retain their proper sequence, provide for easy manipulation and permit segregation into multiple groups by placing rubber bands around any quantity of counters 70 in sequence.

(C) Multiplication and division. Indicia 75 and their arrangement in boxes 74a on surface 74 are utilized as follows:

*Example I.*—To find 3×2, select the vertical column of 3's and count two of the 3's upwardly from the bottom. Then read the answer either by pivoting the particular counter 70 to identify it as #6 of indicia 73 on its opposite surface 72, or look at the number of indicia 75 at the extreme right of the row which also identifies it as #6. It can also be shown that the vertical column of 2's can be selected and three of the 2's counted to arrive at the #6 counter 70.

*Example II.*—To find 10÷3, starting with the counters 70 all extending towards the right at shown in FIG. 1, pivot the first ten counters 70 to the left rest position. Then count the number of 3's in the vertical column, the answer being "3" with one counter 70 remaining.

In both of the above examples the counters 70 may be grouped in 3's by placing a rubber band around each group to further illustrate the meaning of multiplication and division.

(D) Factoring. The factors of each number, as indicia 75, are clearly shown on bottom surface 74.

(E) Squaring numbers. The square of each number appears on each counter front side 76 as indicia 77 shown in FIG. 3, and is located in substantial alignment with its corresponding root number on surface 74. The significance of squaring can be illustrated by reference to FIG. 2 where each root number appears in the diagonal row and occupies an upper right corner box 74a of a large square. Thus, root #20 can be shown to occupy the upper right corner box 74a of the large overall square having four hundred boxes 74a, while root #4 can be shown to occupy the upper right corner box 74a of a much smaller square having sixteen boxes 74a.

(F) Fractions. By grouping counters 70 with the aid of rubber bands or otherwise it can be shown that ⅓ indicates one counter 70 in a bundle of three, that ⅖ indicates two counters 70 in a bundle of five, etc.

Teaching aid 50 is intended to be used in conjunction with other aids presently available in the classroom, such as, the blackboard, which should be used to record the problems being performed on the teaching aid 50 in conventional symbols. Thus, in doing the division problem 10÷3, the example is written on the blackboard and after the answer "3" with "1" remaining is found on teaching aid 50, such answer is also written on the blackboard:

$$10 \div 3 = 3 + \frac{1}{3}$$

The meaning of the fraction ⅓ can then be further explained as one counter toward making up a whole group of three counters.

It will be clear from the above that the pivotability and arrangement of counters 70 coupled with the arithmetic information contained thereon provide a handy teaching aid whereby children are motivated to learn basic arithmetic while doing something with their hands to increase their ability to concentrate and to understand arithmetic concepts and to reduce their restlessness.

As an instrumentality specifically for introducing children at a pre-school, kindergarten or first grade level to elementary arithmetic by an understanding of numbers one to ten utilizing the senses of sight, touch and hearing, a modified form of the invention is shown in FIG. 4 as teaching aid 150. The latter is seen to comprise a frame 160 having front and rear walls 161 and 162, right and left transverse walls 163 and 164 and a rod 165, all substantially similar to corresponding parts of teaching aid 50. Rod 165 pivotally supports a series of ten counters 170 which are more massive than counters 70, being preferably rectangular in cross-section to provide relatively wide top and bottom surfaces 172 and 174 which carry indicia 173 and 175, respectively, similar to indicia 73 and 75, but in larger and bolder type. The overall dimensions of bottom surface 174 may require boxes 174a to be made rectangular in shape as illustrated.

Another modified form of the invention is shown in FIGS. 5 to 8, inclusive, as teaching aid folder 250 which may be constructed of cardboard or other sheet material to comprise a front cover 260, a rear cover 261, and a plurality of counters 270 mounted therebetween in book form by a binding 262.

Counters 270 are mounted to lie in longitudinal edge-to-edge abutment with each other for swinging individually or in any desired groups, when covers 260 and 261 are opened and spread flat, as shown in FIG. 6, from a first position wherein each top surface 272 is upfacing and counter 270 overlies rear cover 261 to a second position wherein each bottom surface 274 is upfacing with counter 270 overlying front cover 260.

Any suitable means may be used to hinge counters 270 to covers 260 and 261. For example, a spiral spring binding (not shown) may be used in the well understood manner, or as shown in FIG. 8, an adhesive type binding 262 may comprise an exterior strip 262a adhesively secured to hinge front cover 260 to rear cover 261, an interior strip 262b adhesively securing front cover 260 to hinge each counter 270 and another interior strip 262c adhesively securing rear cover 261 to each counter 270. As is clear from FIG. 6, binding strips 262b and 262c are slit between each of the counters 270 to provide for separate individual swinging movement.

Counters 270 may be of equal length and sized to have free ends 271 thereof extend beyond the edges of covers 260, 261 opposite binding 262 to permit easy manipulation when folder 250 is spread flat in open position. The top surface 272 of each counter 270 carries indicia 273 corresponding to indicia 73 and 173 of counters 70 and 170, and the bottom surface 274 carries indicia 275 and boxes 274a corresponding to indicia 75, 175 and boxes 74a, 174a as hereinbefore described.

As will be clear from FIGS. 6 and 6a, boxes 274a may be grouped in each vertical column to correspond to the numeral represented by the column. Thus, beginning at the left, the numeral "1" column has the boxes 274a alternately shaded or colored, the numeral "2" column has each pair of boxes 274a alternately shaded, the numeral "3" column has every three boxes 274a alternately shaded with one "left over" at the top of the column, the numeral "4" column has two groups of four alternately shaded with two "left over" on the top of the column, the numeral "5" column is shaded half and half, and the remaining columns shaded in two parts. This shading or coloring serves as a graphic representation of the size of whole numbers as well as an aid to the understanding of multiplication and division.

In use, folder 250 is opened, that is, covers 260, 261 are spread flat to expose counters 270. The open folder may then be placed on the child's lap or held at an angle to the horizontal propped against the edge of the desk or table in front of the child so that free ends 271 of counters 270 extending beyond covers 260, 261 are readily accessible for flipping back and forth for use in the same manner as hereinbefore described for teaching aids 50 and 150. As seen in FIG. 5, with folder 250 closed, the exposed ends of counters 270 bear the numbers or integers comprising the "module 10." This can be utilized, using a plurality of folders 250 placed end to end, to illustrate "modulo arithmetic."

With folder 250 in open position it will be noted that a scale or series of number lines are provided on the inside surface of covers 260, 261 along the edge borders thereof opposite binding 262. Each scale is divided itno equal increments so that the number lines are spaced to register with counters 270, one counter lying between each pair of number lines. By numbering the lines on one cover in the opposite direction with respect to those on the opposite cover as will be clear from FIG. 6, two folders 250 may be brought together so that cover 261 of one abuts cover 260 of the other and then by sliding the two reciprocal scales so that the o's coincide the concepts of positive and negative numbers, coordinate system. etc. may be illustrated. Other alignments of the reciprocal scales may be used to illustrate associative arithmetic. For example, with the ascending scale from bottom to top of cover 260 placed on the right against the descending scale of a cover 261 placed on the left, when the two scales are aligned the sums of each corresponding pair is 10. Now holding the left scale stationary and moving the right scale upward three increments each of the remaining seven pairs now add up to 10—3 or 7. When the right scale is moved downwardly with respect to the left scale a desired number of increments, such as two, each of the remaining pairs now add up to 10+2 or 12. It is thus seen that the sum of the numbers in each pair of number lines is a direct indication of the displacement magnitude and direction.

Other modifications may be made embodying the invention wherein any desirable number of counters 70, 170, or 270 are incorporated in the teaching aid within the concept of having each indicia 75, 175 or 275 include factors relating to the particular number of the counter as established by its relative position and maintaining the overall desired pattern correlating the factors. However, where more than twenty or twenty-five counters are utilized it may be desirable to limit the boxes 74a to twenty or twenty-five so as to avoid the counters becoming unwieldly in length. Thus, for example, where a fifty counter teaching aid is limited to twenty boxes 74a, the forty-eighth counter will bear the following factors:

1 2 3 4    6    8    12    16

Appropriate indicia 77 are shown in FIG. 3 on the front side surfaces of each counter 70 and represent the square of the number of the respective counter.

Teaching aids 50, 150 and 250 may also be used at home as educational toys and may be provided as individual units or incorporated in other toys, such as, in a work bench and blackboard combination.

It is thus seen that there is provided improved teaching aids and educational toys whereby the several objects of this invention are achieved and which are well adapted to meet the conditions of practical use.

As various possible embodiments might be made of the above invention, and as various changes might be made in the embodiments above set forth, it is to be understood that all matters herein set forth or shown in the accompanying drawing are to be interpreted as illustrative and not in a limiting sense.

Having thus described my invention, I claim as new and desire to secure by Letters Patent:

1. A portable arithmetic teaching aid comprising a support sized for lap or table use by a child being taught and having right and left side edges, a plurality of elongated consecutively numbered counters arranged side by side in a series, hinge means individually mounting one end of each counter on said support along an axis extending from front to rear of the supoprt and spaced between said side edges, each counter being sized for selective positioning to overlie and extend beyond one of said side edges and to swing on said hinge means to overlie and extend beyond the other of said side edges, each counter having a visibly exposed surface when in one and the same of said selective positions bearing a number corresponding to the relative position of the counter in the series, each counter having a free end extending sufficiently beyond the respective right and left side edges of said support for finger access to an underside thereof for flipping from one position to the other by said child and for binding a plurality of consecutive counters in groups.

2. The portion arithmetic teaching aid defined in claim 1 in which said support is the front and rear covers of a folder open and spread flat when in use and said hinge means is a binding for the folder.

3. The portable arithmetic teaching aid defined in claim 1 in which each counter has an opposite surface bearing factoring information in the form of all the integers related to said number corresponding to the relative position of the counter.

4. The portable arithmetic teaching aid defined in claim 1 in which each counter has a side surface adjacent said number bearing surface, said side surface bearing a numerical indication of the square of the respective number of the counter.

5. The portable arithmetic teaching aid defined in claim 1 in which said support comprises a frame having front, rear, right side and left side walls framing an interior area, said hinge means being a rod extending from the front to rear walls through said interior area, the right and left side walls of the frame providing said right and left side edges.

6. The portable arithmetic teaching aid defined in claim 2 in which each of said side edges has a border bearing a scale of number lines divided into equal increments spaced to register with said overlying counters, the number lines along one of said edges being numbered as reciprocals of those of the other of said edges.

7. The portable arithmetic teaching aid defined in claim 3 in which boxes are positioned in sequential series along the length of each counter on said opposite surface, each factor being located in a box corresponding to the numerical value of the factor, the boxes of each counter being in alignment with corresponding boxes of the other counters to form rows extending transversely with respect to the length of the counters.

8. The portable arithmeic teaching aid defined in claim 5 in which said counters and frame are constructed and arranged when finger flipping the counters from one position to the other so that an audible sound is made by the counter striking the opposite side wall.

9. The portable arithmetic teaching aid defined in claim 7 in which ten counters are mounted on said hinge means and ten boxes are located on said opposite surface of each counter providing a teaching aid for pre-school and first graders.

10. The portable arithmetic teaching aid defined in claim 7 in which at least twenty counters are mounted on said hinge means and twenty boxes are located on said opopsite surface of each counter providing a large square of four hundred boxes when said surfaces of all the twenty counters are simultaneously visible.

11. The portable arithmetic teaching aid defined in claim 7 in which the boxes in each of said transverse rows are grouped by alternate shading to correspond in number to the numeral represented by the row.

12. A device as an aid for learning arithmetic comprising a plurality of elongated substantially identically sized and shaped counters arranged side by side in a series, each counter having a first surface bearing a number corresponding to the relative position of the counter in the series counting from one end, an opposite surface of each counter having factoring information in the form of all the integers related to the number carried on its first surface, means supporting each of said counters in said side by side arrangement for selective and separate pivoting at one end thereof on a tranverse axis from a first position wherein said first surface is visibly exposed to a second position wherein said opposite surface is visibly exposed.

References Cited by the Examiner

UNITED STATES PATENTS

| 665,228 | 1/1901 | Kahlert | 35—31.2 |
| 702,528 | 8/1902 | Christian | 35—75 |
| 1,246,152 | 11/1917 | Perrine | 35—69.1 |

FOREIGN PATENTS

| 53,945 | 10/1890 | Germany. |

EUGENE R. CAPOZIO, *Primary Examiner.*

W. GRIEB, *Assistant Examiner.*